United States Patent
Ballarin (10) Patent No.: US 9,893,618 B2
(45) Date of Patent: Feb. 13, 2018

(54) VOLTAGE REGULATOR WITH FAST FEEDBACK

(71) Applicant: Infineon Technologies AG, Neubiberg (DE)

(72) Inventor: Fabio Ballarin, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/146,583

(22) Filed: May 4, 2016

(65) Prior Publication Data
US 2017/0324324 A1  Nov. 9, 2017

(51) Int. Cl.
| G05F 1/565 | (2006.01) |
| G05F 1/00 | (2006.01) |
| H02H 7/00 | (2006.01) |
| H02H 9/00 | (2006.01) |
| H02M 3/158 | (2006.01) |
| H02M 1/08 | (2006.01) |

(52) U.S. Cl.
CPC ............ *H02M 3/158* (2013.01); *H02M 1/08* (2013.01)

(58) Field of Classification Search
CPC ........... G05F 1/461; G05F 1/562; G05F 1/575
USPC ....... 323/239, 246, 266, 270, 271, 275, 280, 323/284, 285; 361/18
See application file for complete search history.

(56) References Cited

U.S. PATENT DOCUMENTS

| 5,889,393 | A | 3/1999 | Wrathall |
| 6,333,623 | B1 | 12/2001 | Heisley et al. |
| 6,922,099 | B2 | 7/2005 | Shor et al. |
| 7,038,434 | B1 | 5/2006 | Brekelmans et al. |
| 7,312,598 | B1 | 12/2007 | Huang |
| 7,495,422 | B2 | 2/2009 | Mok et al. |
| 8,102,163 | B2 | 1/2012 | Imura |
| 8,436,597 | B2 | 5/2013 | Sicard |
| 9,195,248 | B2 | 11/2015 | Zegheru et al. |
| 2009/0200999 | A1* | 8/2009 | Lou .......................... G05F 1/575 323/280 |
| 2011/0267017 | A1* | 11/2011 | Zhang ..................... G05F 1/575 323/280 |

(Continued)

FOREIGN PATENT DOCUMENTS

| CA | 2638485 A1 | 3/2009 |
| CN | 103729003 A | 4/2014 |
| EP | 1429222 A1 | 6/2004 |

OTHER PUBLICATIONS

"LV124, Electric and Electronic Components in Motor Vehicles up to 3.5 t—General Component Requirements, Test Conditions, and Tests," Version 1.3, Mar. 10, 2010, 124 pages.

(Continued)

*Primary Examiner* — Gary Nash
(74) *Attorney, Agent, or Firm* — Shumaker & Sieffert, P.A.

(57) ABSTRACT

In some examples, a voltage regulator comprises an amplifier stage and a pass element configured to receive an output of the amplifier stage and an output of a feedback circuit. The voltage regulator further comprises the feedback circuit configured to receive an output of the pass element, wherein the feedback circuit includes a differentiator stage coupled to a feedback output stage, and wherein the differentiator stage comprises a single capacitor configured to differentiate an output voltage of the pass element.

20 Claims, 9 Drawing Sheets

(56) References Cited

U.S. PATENT DOCUMENTS

| | | | | |
|---|---|---|---|---|
| 2012/0176109 A1* | 7/2012 | Riederer | ................... | G05F 1/56 |
| | | | | 323/282 |
| 2012/0212200 A1* | 8/2012 | Amer | ...................... | G05F 1/575 |
| | | | | 323/282 |
| 2013/0285631 A1 | 10/2013 | Bisson et al. | | |
| 2014/0184340 A1* | 7/2014 | Snoeij | ................... | H03F 3/3028 |
| | | | | 330/300 |

OTHER PUBLICATIONS

"IFX7805, Three Terminal 1.0A Positive Voltage Regulator," Infineon, Standard Power, Datasheet, Rev. 1.0, Jul. 15, 2013, 18 pp.
Suresh et al., "Fully on Chip Area Efficient LDO Voltage Regulator," 2014 IEEE Region 10 Conference TENCON 2014, Oct. 22-25, 2014, 5 pp.

* cited by examiner

VOLTAGE REGULATOR WITH FAST FEEDBACK

TECHNICAL FIELD

This disclosure relates to voltage regulators and, more particularly, to voltage regulators with feedback loops.

BACKGROUND

A voltage regulator is a device that produces a steady output voltage for use by other components in an electrical circuit. A voltage regulator may behave like a variable resistance, where the resistance of the voltage regulator varies with the load impedance. There are different types of voltage regulators, such as linear voltage regulator and switching voltage regulators. A linear voltage regulator may include an amplifier that controls a pass device, which may include a transistor. The amplifier in a linear voltage regulator may compare the output voltage of the voltage regulator with a reference voltage and adjust the pass device to maintain a constant output voltage.

SUMMARY

This disclosure describes techniques for a voltage regulator that comprises an amplifier stage and a pass element configured to receive an output signal of the amplifier stage and an output signal of a feedback circuit. The voltage regulator further comprises the feedback circuit configured to receive the output signal of the pass element, wherein the feedback circuit includes a differentiator stage coupled to a feedback output stage, and wherein the differentiator stage comprises a single capacitor configured to differentiate the output signal of the pass element.

In some examples, a voltage regulator contains a feedback circuit that provides a fast feedback to changes in load impedance and during startup. The feedback circuit contains a single capacitor instead of a high-side capacitor and a low-side capacitor. The single capacitor results in less chip space for the feedback circuit.

In some examples, a method comprises receiving, by a feedback circuit of a voltage regulator, an input signal from a pass element of the voltage regulator. The method further comprises differentiating, by a single capacitor of the feedback circuit, the input signal into a differentiated signal. The method further comprises receiving, at a feedback output stage of the feedback circuit, the differentiated signal. The method further comprises outputting, from the feedback output stage to the pass element, an output signal.

In some examples, a feedback circuit is configured to receive an input signal from a pass element. The feedback circuit is further configured to differentiate, by a single capacitor of the feedback circuit, the input signal into a differentiated signal. The feedback circuit is further configured to receive, at a feedback output stage of the feedback circuit, the differentiated signal. The feedback circuit is further configured to output, from the feedback output stage to the pass element, an output signal.

The details of one or more examples are set forth in the accompanying drawings and the description below. Other features, objects, and advantages will be apparent from the description and drawings, and from the claims.

DETAILED DESCRIPTION

The performance of a voltage regulator depends on how well the regulator maintains a stable output voltage, especially given dynamic inputs. A voltage regulator may employ a nested fast loop, together with a main regulation loop to improve the load transient response by reducing overshoots and undershoots at the output node of the regulator. During device start-up, or when other factors change suddenly, a voltage regulator may struggle to quickly achieve a stable output voltage.

A feedback circuit within nested fast loop of a voltage regulator may include a high side and a low side. The high side and the low side of the feedback circuit may each include a capacitor to differentiate, or measure changes in, the output voltage of the regulator. By combining the high side and the low side capacitors of the feedback circuit, the feedback circuit may consume less chip space. The proposed solution may offer the same performance using only one differentiating capacitor, thus saving half of the differentiator capacitor area. This savings may be especially convenient for applications requiring high-voltage capacitors with low specific capacitance. As an example, the regulator may consume five or ten percent less chip space with a single differentiator capacitor, as compared to two differentiator capacitors.

Figure 1:
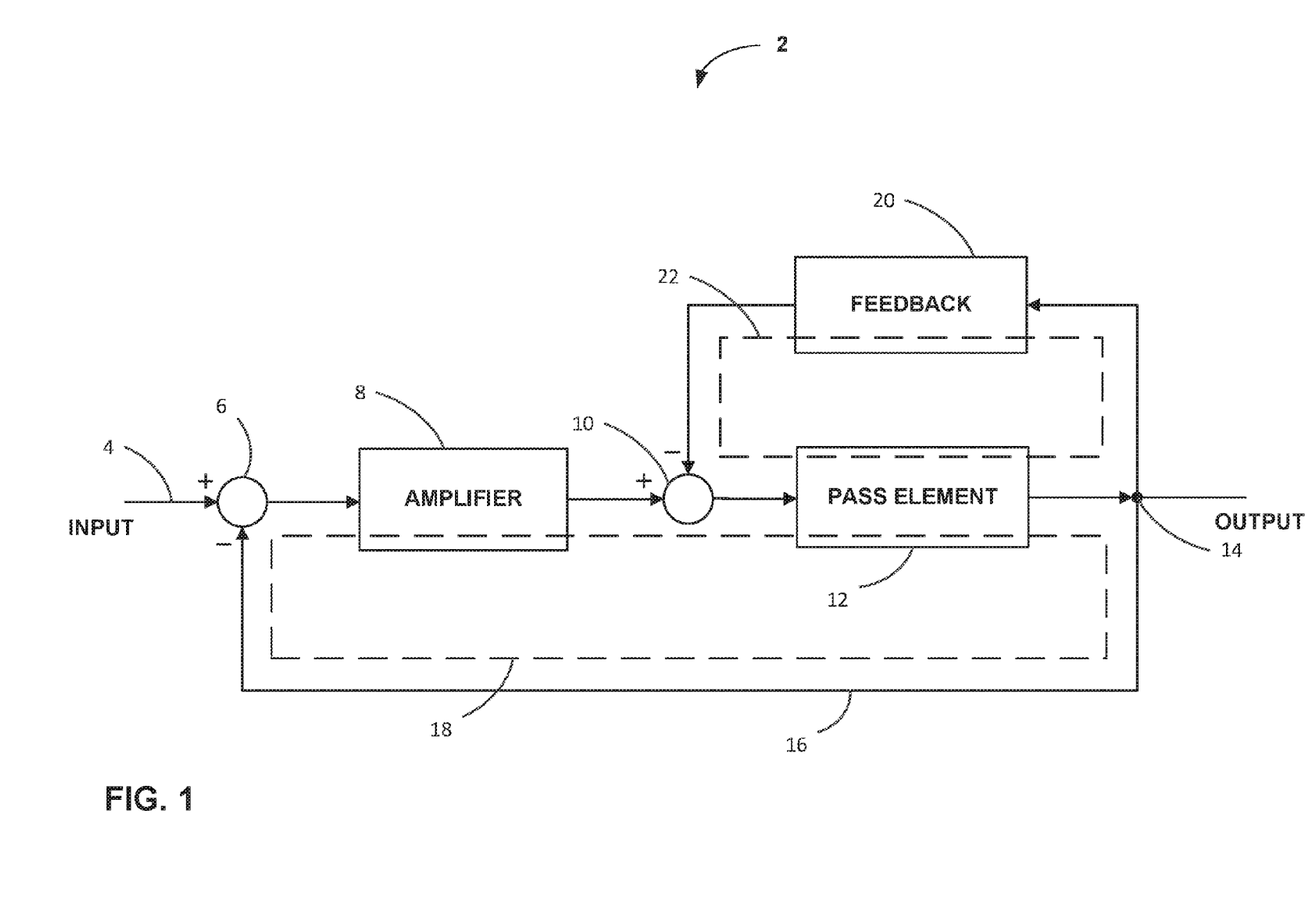
FIG. 1 is a conceptual block diagram of a voltage regulator with feedback in accordance with some examples of this disclosure.

FIG. 1 is a conceptual block diagram of a voltage regulator 2 with feedback in accordance with some examples of this disclosure. Voltage regulator 2 may contain main regulation loop 18 and nested fast loop 22. Both loops may operate to maintain a nearly constant voltage at output node 14 based on the voltage of input line 4.

Input line 4 may conduct an electrical signal such as a reference voltage. Input line 4 may conduct a direct current (DC) or an alternating current (AC), depending on the source of the electrical signal on input line 4. Input line 4 may deliver an electrical signal to input node 6 or directly to amplifier stage 8.

Input node 6 may receive electrical signals from input line 4 and main regulation line 16. Input node 6 may subtract the voltage in main regulation line 16 from the voltage at input line 4, as indicated by the plus and minus signs in FIG. 1. In some examples, input node 6 and main regulation line 16 may not intersect but may instead conduct signals into a comparator at amplifier stage 8. Input node 6 may be a part of main regulation loop 18.

Amplifier stage 8 may receive and amplify the signal or signals from input node 6. In some examples, amplifier stage 8 may comprise an operational amplifier that functions as a comparator. Amplifier stage 8 may receive a signal from input line 4 at a positive input terminal of amplifier stage 8 and a signal from main regulation line 16 at a negative input terminal of amplifier stage 8. Acting as a comparator, amplifier stage 8 may subtract the voltage of main regulation line 16 from the voltage at input line 4 and amplify the difference between the two voltages. The output of amplifier stage 8 may be coupled to amplifier node 10.

Amplifier node 10 may receive a signal from the output of amplifier stage 8 and an output from feedback circuit 20. Amplifier node 10 may be a part of main regulation loop 18 and nested fast loop 22. Amplifier node 10 may subtract the voltage at the output of feedback circuit 20 from the voltage at the output of amplifier stage 8, as indicated by the plus and minus signs in FIG. 1. Amplifier node 10 may deliver an electrical signal to pass element 12.

Pass element 12 may receive an electrical signal from amplifier node 10 may output an electrical signal to output node 14. Pass element 12 may contain a transistor configured to increase or decrease an electrical current based on the electrical signal received from amplifier node 10. Pass element 12 may comprise one or more bipolar junction transistors (BJTs) or metal-oxide-semiconductor field-effect transistors (MOSFETs).

Output node 14 may receive an electrical signal from pass element 12 and output the electrical signal to another electrical circuit. Voltage regulator 2 may be configured to maintain a stable voltage at output node 14. Output node 14 may be coupled to main regulation line 16 and to the input of feedback circuit 20. Output node 14 may supply a nearly constant voltage for various applications, such as charging mobile phones and supplying power to computers, among other applications. Voltage regulator 2 may supply relatively high current via output node 14 because of a low output impedance of voltage regulator 2.

Main regulation line 16 may transmit an electrical signal from output node 14 to input node 6. Main regulation line 16 may be a part of main regulation loop 18. Main regulation line 16 may contain one or more resistors to divide the voltage at output node 14 before delivering the voltage to input node 6. In some examples, main regulation line 16 may be connected directly to amplifier stage 8.

Main regulation loop 18 may include input node 6, amplifier stage 8, amplifier node 10, pass element 12, output node 14, and main regulation line 16. Main regulation loop 18 may be configured to deliver an electrical signal from output node 14 to amplifier stage 8 to regulate the voltage at output node 14 to obtain a stable voltage. Main regulation loop 18 may allow an overshoot or undershoot in the voltage at output node 14 if the electrical signal from input line 4, or the voltage at output node 14, changes rapidly. Main regulation loop 18 may achieve high precision with limited bandwidth.

Feedback circuit 20 may be configured to receive an electrical signal from output node 14 and output an electrical signal to amplifier node 10. Feedback circuit 20 may contain a differentiator stage coupled to output node 14 and a feedback output stage coupled to amplifier node 10. In some examples, feedback circuit 20 may be configured to provide negative feedback to amplifier node 10 by differentiating the voltage at output node 14.

Nested fast loop 22 may include amplifier node 10, pass element 12, output node 14, and feedback circuit 20. Nested fast loop 22 may be configured to provide negative feedback, thereby regulating the voltage at output node 14. Nested fast loop 22 may be configured to provide a feedback signal that opposes changes in the voltage at output node 14. Nested fast loop 22 may react more quickly than main regulation loop 18 because nested fast loop 22 may not include amplifier stage 8.

By including nested fast loop 22, voltage regulator 2 may react to sudden changes in the electrical signals on input line 4 or at output node 14. As a result, voltage regulator 2 may achieve higher robustness and greater dynamic performance by reducing undershoots and overshoots at output node 14. Without nested fast loop 22, voltage regulator 2 may perform worse in positive or negative load steps or during startup. Nested fast loop 22 may improve the dynamic performance of voltage regulator 2 without affecting the static precision of voltage regulator 2. In some examples, nested fast loop 22 may decrease overshoot at start-up from seven hundred millivolts to one hundred millivolts.

Figure 2:
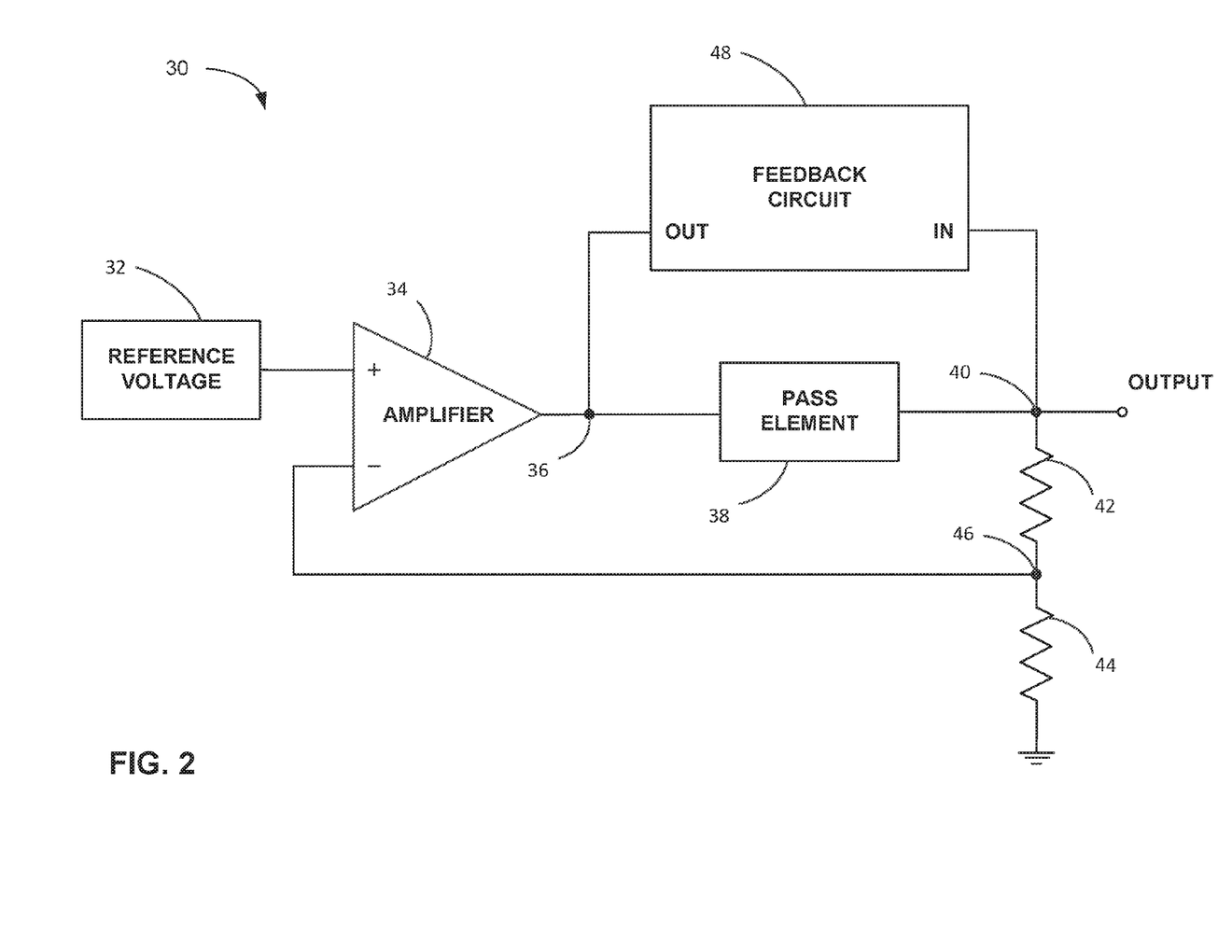
FIG. 2 is a conceptual block and circuit diagram of a voltage regulator with a feedback circuit in accordance with some examples of this disclosure.

FIG. 2 is a conceptual block and circuit diagram of a voltage regulator 30 that includes a feedback circuit 48 in accordance with some examples of this disclosure.

Voltage regulator 30 may function in a similar manner to voltage regulator 2. The components of voltage regulator 30 may be similar to the components of voltage regulator 2.

Amplifier stage 34 may receive reference voltage 32 and divided voltage 46. Amplifier stage 34 may be an operational amplifier that acts as a comparator, amplifying the difference between reference voltage 32 and the voltage at divider node 46. Amplifier stage 34 may also act as an error amplifier. Reference voltage 32 may originate from a voltage reference generation block, such as a bandgap reference voltage, and may be connected to the positive input terminal of amplifier stage 34. Divider node 46 may be connected to the negative input terminal of amplifier stage 34. Amplifier stage 34 may output an electrical signal to amplifier node 36.

Pass element 38 may be configured to receive an electrical signal from amplifier node 36. Amplifier node 36 may receive an output signal from amplifier stage 34 and an output signal from feedback circuit 48. Pass element 38 may include a transistor that increases or decreases the flow of electrical current to output node 40 depending on the electrical signal at amplifier node 36.

Resistors 42 and 44 may divide the voltage at output node 40 and output the divided voltage to divider node 46. Resistors 42 and 44 may be inside or outside of voltage regulator 30. Resistors 42 and 44 may be adjustable in order to tune the voltage at output node 40.

Resistor 42 may be coupled between output node 40 and divider node 46. Resistor 44 may be coupled between divider node 46 and reference ground. Divider node 46 may be coupled to the negative input terminal of amplifier stage 34. The voltage at divider node 46 may depend on the impedances of resistors 42 and 44. As the voltage at output node 40 increases, the voltage at divider node 46 may increase, thereby decreasing the voltage at amplifier node 36. Therefore, the output voltage of the pass element may be based on an impedance of the resistor 42, in relation to the impedance of resistor 44. A smoothing capacitor (not shown in FIG. 2) may be coupled between output node 40 and the reference ground to further regulate the output signal of voltage regulator 30. The smoothing capacitor may be coupled between output node 40 and divider node 46.

Feedback circuit 48 may be configured to receive an electrical signal from output node 40 and output an electrical signal to amplifier node 36. Feedback circuit 48 may contain a differentiator stage coupled to output node 40 and a feedback output stage coupled to amplifier node 36. In some examples, feedback circuit 48 may be configured to generate and transmit negative feedback to amplifier node 36 based on the output voltage of pass element 38. In some example, negative feedback may mean that an increasing output voltage of pass element 38 leads to a negative voltage or a negative current at the output node of feedback circuit 48.

Figure 3:
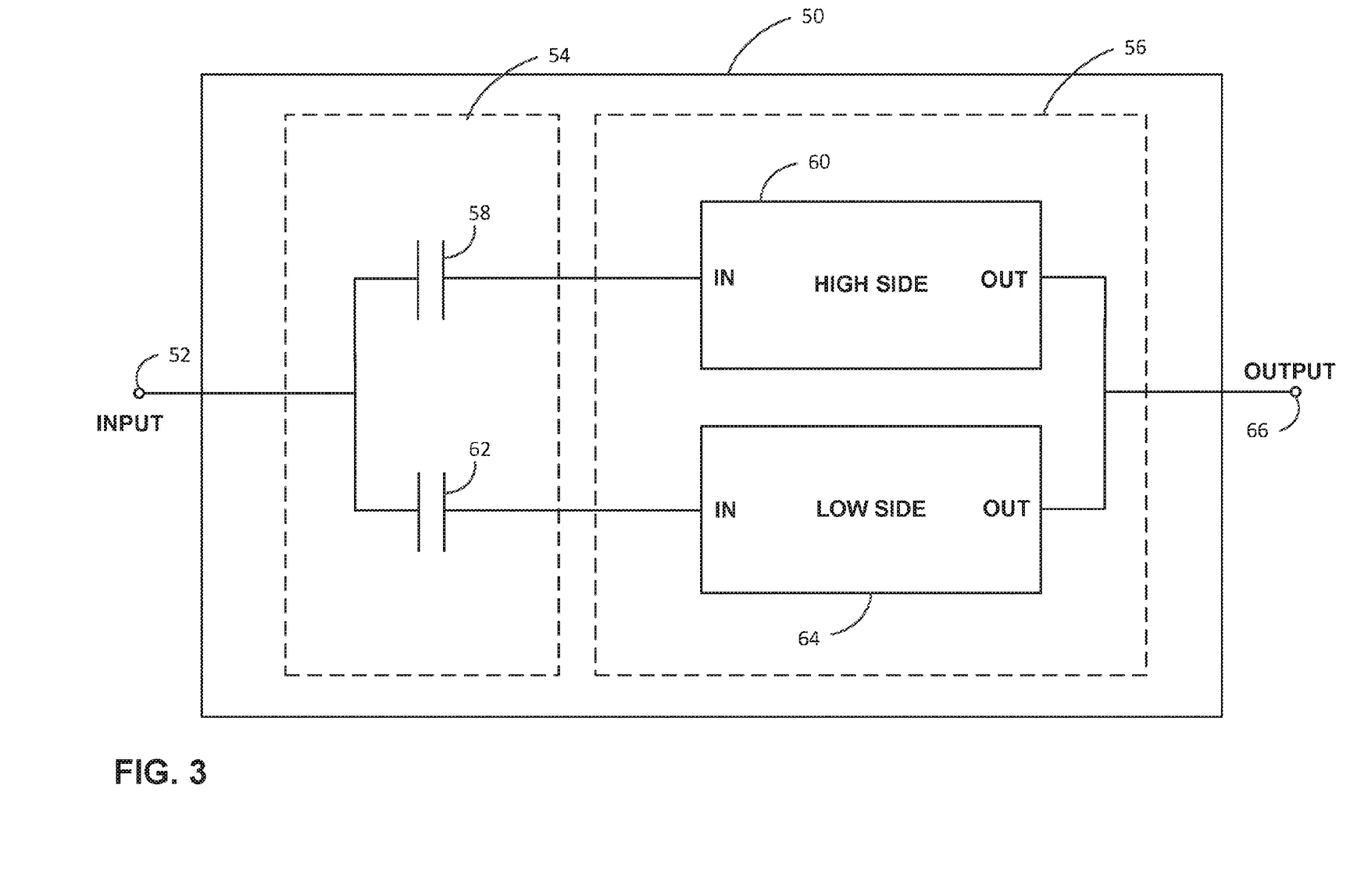
FIG. 3 is a conceptual block and circuit diagram of a feedback circuit in a voltage regulator in accordance with some examples of this disclosure.

FIG. 3 is a conceptual block and circuit diagram of a feedback circuit 50 in a voltage regulator in accordance with some examples of this disclosure. Feedback circuit 50 may include feedback circuit input node 52, differentiator stage 54, feedback output stage 56, and feedback circuit output node 58. Feedback circuit 50 may have the benefits of low device count, for devices such as transistors or analog devices, and low power consumption due to low quiescent currents through the devices.

Differentiator stage 54 may be coupled between feedback circuit input node 52 and feedback output stage 56. Differentiator stage 54 may include high side capacitor 58 and low side capacitor 62. Each of capacitors 58 and 62 may be configured to differentiate the voltage at feedback circuit input node 52, based on the equation, i(t)=Cdv(t)/dt. In this equation, i(t) is the current flowing out of the capacitor, C is the capacitance of the capacitor, and dv(t)/dt is the rate of change of the voltage at feedback circuit input node 52 as a function of time. Thus, differentiator stage 54 may differentiate the voltage of a signal received from pass element 38 and produce a current that corresponds to the rate of change of the voltage over time.

If the voltage at feedback circuit input node 52 is constant, differentiator stage 54 may deliver zero current to feedback output stage 56. If the voltage at feedback circuit input node 52 increases, differentiator stage 54 may deliver a positive electrical current to feedback output stage 56. If the voltage at feedback circuit input node 52 decreases, differentiator stage 54 may deliver a negative electrical current to feedback output stage 56.

Feedback output stage 56 may be coupled between differentiator stage 54 and feedback circuit output node 66. Feedback output stage 56 may include high side feedback output stage 60 and low side feedback output stage 64. Feedback output stage 56 may be configured such that one or none of high side feedback output stage 60 and low side feedback output stage 64 may deliver an electrical signal to feedback circuit output node 66 at any time. In some examples, if the voltage at feedback circuit input node 52 is constant, high side feedback output stage 60 and low side feedback output stage 64 may deliver equal currents to feedback circuit output node 66. For a stable voltage at feedback circuit input node 52, the current at feedback circuit output node 66 may be zero.

In the event of an overshoot at feedback circuit input node 52, low side feedback output stage 64 may sink more current than high side feedback output stage 60. Low side feedback output stage 64 may pull down the voltage at feedback circuit output node 66. In the event of an undershoot at feedback circuit input node 52, high side feedback output stage 60 may push more current to feedback circuit output node 66 than low side feedback output stage 64.

Figure 4:
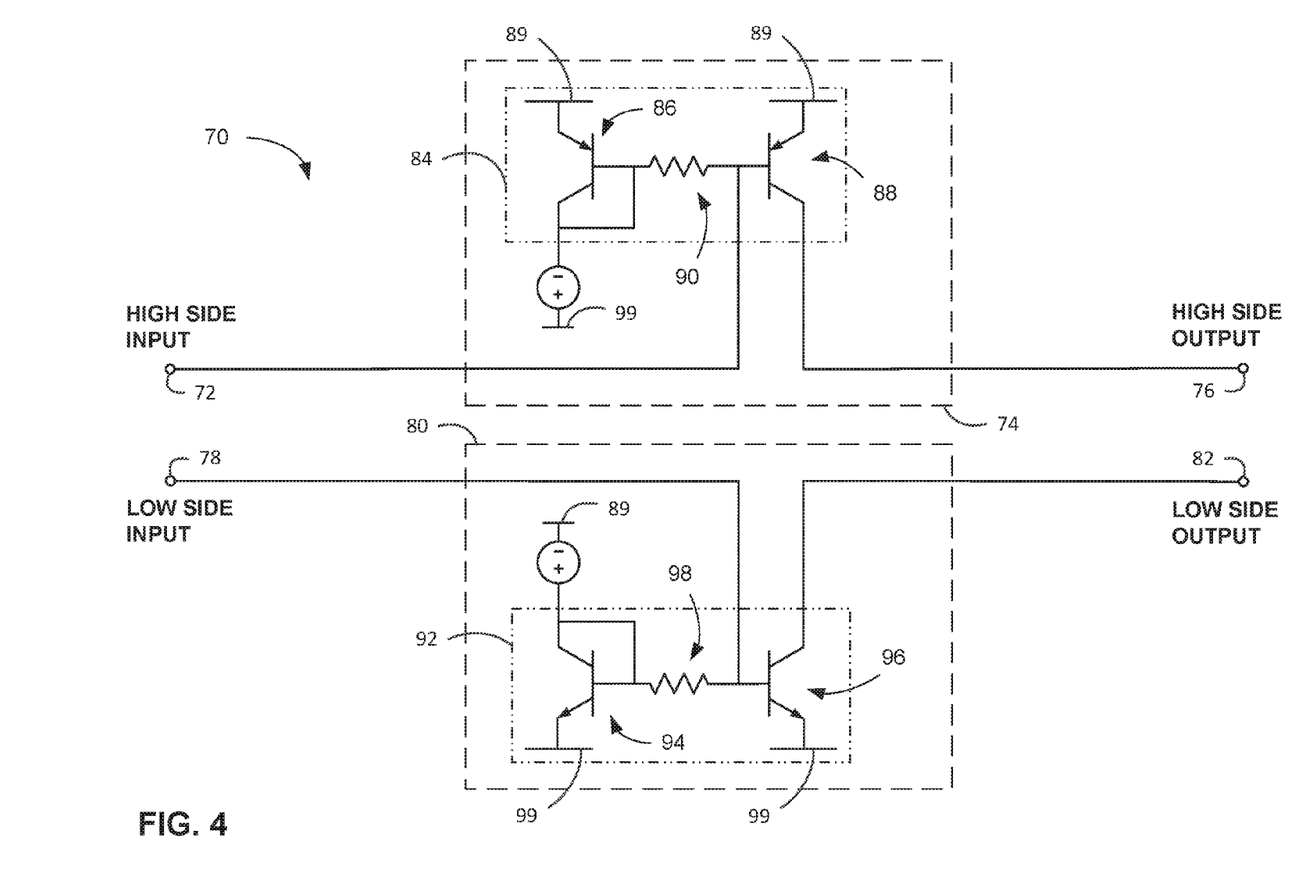
FIG. 4 is a circuit diagram of a feedback output stage in a voltage regulator in accordance with some examples of this disclosure.

FIG. 4 is a circuit diagram of a feedback output stage 70 in a voltage regulator in accordance with some examples of this disclosure. Feedback output stage 70 may include high side feedback output stage 74 and low side feedback output stage 80. High side feedback output stage 74 may be coupled between high side input node 72 and high side output node 76. Low side feedback output stage 74 may be coupled between low side input node 78 and low side output node 82.

High side feedback output stage 74 may include a current mirror 84 with two transistors 86 and 88. Transistors 86 and 88 may be separated by resistor 90. Transistors 86 and 88 may be BJTs, MOSFETs, or any other transistors or analog devices. In some examples, transistors 86 and 88 may be p-type transistors, such as pnp or PMOS transistors. Transistor 86 may be a diode-connected transistor with a load terminal and a control terminal connected to a current source. Transistor 88 may have a load terminal that is coupled to high side output node 76. Each of transistors 86 and 88 may have a load terminal that is connected to positive supply rail 89. If transistors 86 and 88 are BJTs, the emitter terminal may be connected to positive supply rail 89, and if transistors 86 and 88 are MOSFETs, the source terminal may be connected to positive supply rail 89. As with all analog devices and transistors in this disclosure, transistors 86 and 88 may be another analog device besides BJTs or MOSFETs, such as a junction field-effect transistor (JFET), an insulated gate bipolar transistor (IGBT), or a diode, to name a few. BJTs and MOSFETs are described merely as examples.

High side feedback output stage 74 may be configured to increase the voltage at high side output node 76 when the voltage at high side input node 72 is less than the steady state voltage of node 72. The voltage at high side input node 72 may be less than the steady state voltage of node 72 when the output voltage of the voltage regulator is decreasing. To generate a positive output voltage, current mirror 84 may conduct electrical current from positive supply rail 89 through transistor 88 to high side output 76.

Similarly, low side feedback output stage 80 may be configured to decrease the voltage at low side output node 82 when the voltage at low side input node 78 is greater than the steady state voltage of node 78. The voltage at low side input node 78 may be greater than the steady state voltage of node 78 when the output voltage of the voltage regulator is increasing. To generate a negative output voltage, Current mirror 92 may conduct electrical current from low side output node 82 through transistor 96 to negative supply rail 99.

Low side output stage 80 may contain components that are similar to high side output stage 74. Low side feedback output stage 80 may include a current mirror 92 with two transistors 94 and 96. Transistors 94 and 96 may be separated by resistor 98. Transistors 94 and 96 may be BJTs, MOSFETs, or any other transistors or analog devices. In some examples, transistors 94 and 96 may be n-type transistors, such as npn or NMOS transistors. Transistor 94 may be a diode-connected transistor with a load terminal and a control terminal connected to a current source. Transistor 96 may have a load terminal that is coupled to low side output node 82. Each of transistors 94 and 96 may have a load terminal that is connected to a negative supply rail 99. If transistors 94 and 96 are BJTs, the emitter terminal may be connected to negative supply rail 99, and if transistors 94 and 96 are MOSFETs, the source terminal may be connected to negative supply rail 99.

Figure 5:
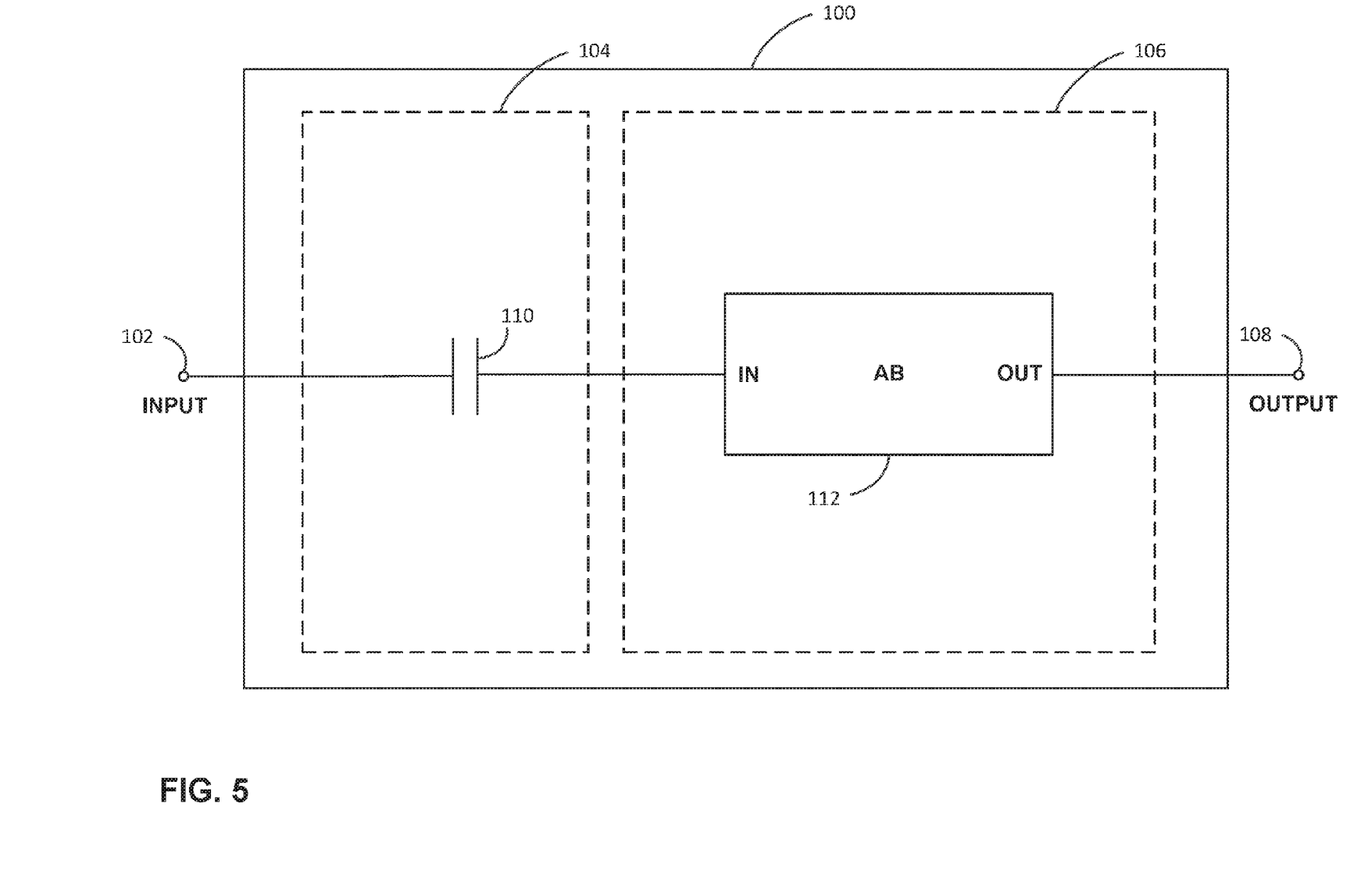
FIG. 5 is a conceptual block and circuit diagram of a feedback circuit with a single-capacitor differentiator stage in a voltage regulator in accordance with some examples of this disclosure.

FIG. 5 is a conceptual block and circuit diagram of a feedback circuit 100 with a single-capacitor differentiator stage 104 in a voltage regulator in accordance with some examples of this disclosure. Feedback circuit 100 may include feedback circuit input node 102, differentiator stage 104, feedback output stage 106, and feedback circuit output node 108.

Differentiator stage 104 may be coupled between feedback circuit input node 102 and feedback output stage 106. Differentiator stage 104 may include a single capacitor 110 configured to differentiate the voltage at feedback circuit input node 102. In some examples, differentiator stage 104 may include other components, potentially even other capacitors. However, in accordance with this disclosure, differentiator stage 104 includes a single capacitor 110 configured to differentiate a voltage signal, such as based on the equation, $$i(t) = C\frac{dv(t)}{dt}.$$

In this equation, i(t) is the current flowing out of capacitor 110, C is the capacitance of capacitor 110, and $$\frac{dv(t)}{dt}$$

is the rate of change of the voltage at feedback circuit input node 102 as a function of time. If the voltage at feedback circuit input node 102 is constant, differentiator stage 104 may deliver zero current to feedback output stage 106. If the voltage at feedback circuit input node 102 increases, differentiator stage 104 may deliver a positive electrical current to feedback output stage 106. If the voltage at feedback circuit input node 102 decreases, differentiator stage 104 may deliver a negative electrical current to feedback output stage 106.

Feedback output stage 106 may be coupled between differentiator stage 104 and feedback circuit output node 108. Feedback output stage 106 may include class AB output stage 112. Class AB output stage 112 may have a single input and may include a push-pull circuit with two or more transistors. A push-pull circuit may push or pull current to or from the output node of feedback output stage 106. Feedback output stage 106 may deliver an electrical signal to feedback circuit output node 108 based on the electrical signal at feedback circuit input node 102.

As compared to feedback output stage 50 in FIG. 3, feedback output stage 100 may require less chip space because differentiator stage 104 has a single capacitor 110. Feedback output stage 106 may contain approximately the same number and size of components as feedback output stage 56. Therefore, the reduced chip space may be due almost entirely to the single-capacitor differentiator stage 104. Feedback circuit 100 may offer the same performance as feedback circuit 50 while saving half of the differentiator capacitor area. As an example, a voltage regulator device may consume five or ten percent less chip space with feedback circuit 100, as compared to feedback circuit 50. This savings may depend on a variety of factors such as input voltage levels.

Figure 6:
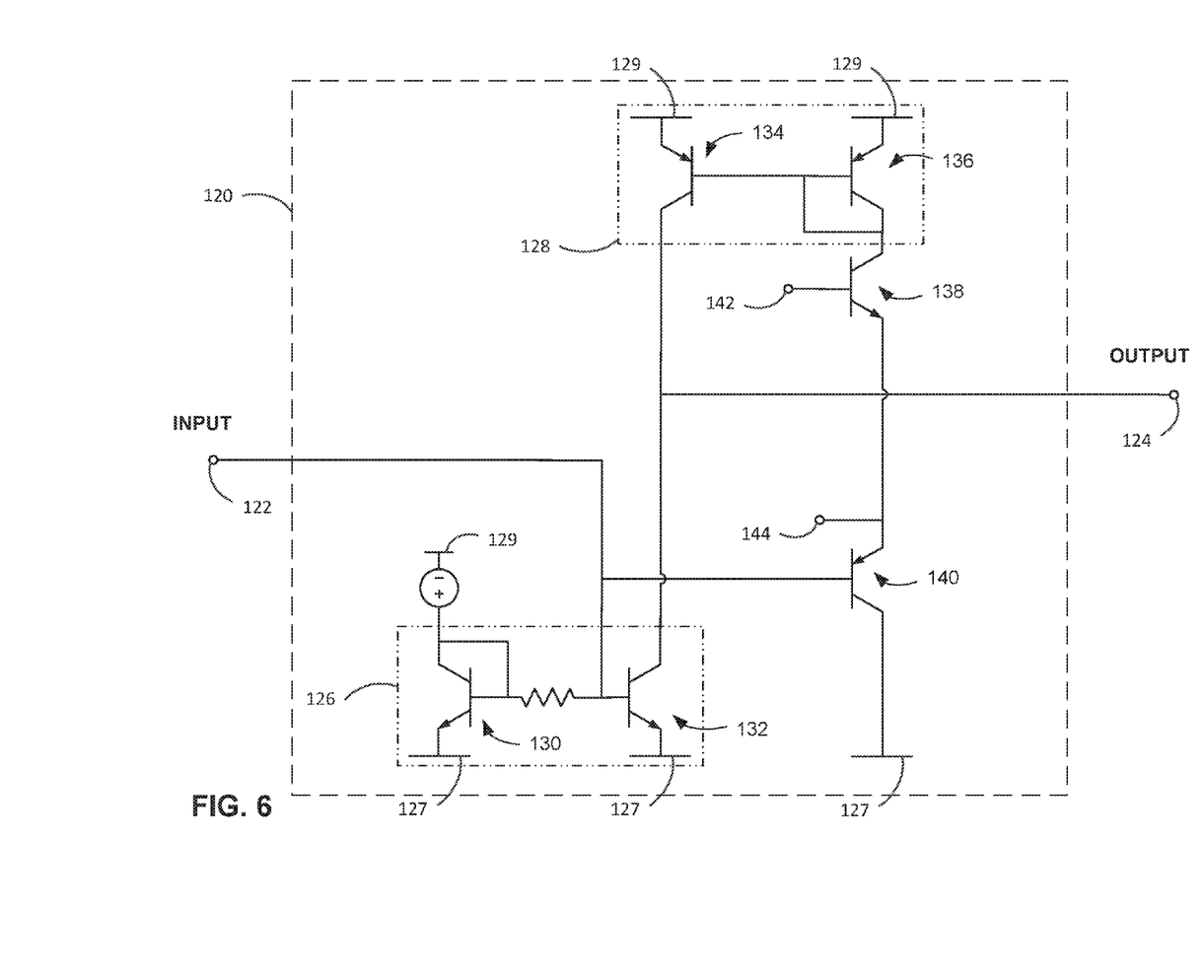
FIG. 6 is a circuit diagram of a feedback output stage in a voltage regulator in accordance with some examples of this disclosure.

FIG. 6 is a circuit diagram of a feedback output stage 120 in a voltage regulator in accordance with some examples of this disclosure. Feedback output stage 120 may be coupled between feedback output stage input node 122 and feedback output stage output node 124. Feedback output stage input node 122 may be coupled to a single-capacitor differentiator stage, and feedback output stage output node 124 may be coupled to amplifier node 36, as shown in FIG. 2. Feedback output stage 120 may be a class AB output stage circuit such as a push-pull amplifier circuit offering push-pull output functionality.

Feedback output stage 120 may be configured to decrease the voltage at feedback output stage output node 124 when the voltage at feedback output stage input node 122 is greater than the steady state voltage of node 122"). When the voltage at feedback output stage input node 122 is greater than the steady state voltage of node 122, current mirror 126 may pull current from feedback output stage output node 124 through transistor 132 to negative supply rail 127. Current mirror 126, which contains transistors 130 and 132, may be similar in function and design to low side current mirror 92 in FIG. 4.

Feedback output stage 120 may be configured to increase the voltage or current at feedback output stage output node 124 when the voltage at feedback output stage input node 122 is less than the steady state voltage of node 122. When the voltage at feedback output stage input node 122 is less than the steady state voltage of node 122, current mirror 128 may push current from positive supply rail 129 through transistor 134 to feedback output stage output node 124.

Bias voltage input nodes 142 and 144 may supply bias voltages to feedback output stage 120. For example, when the voltage at feedback output stage input node 122 is less than the steady state voltage of node 122, transistor 140 may conduct current to negative supply rail 127. When transistor 140 conducts current, transistor 138 may also conduct current, based on the voltage at bias voltage input node 142. If both transistors 138 and 140 conduct, the voltage at the control terminals of current mirror 128 may be low enough that transistor 134 will push current from positive supply rail 129 to feedback circuit output node 124.

Current mirror 126 may include two transistors 130 and 132 separated by a resistor. Transistors 130 and 132 may be BJTs, MOSFETs, or any other transistors or analog devices. In some examples, transistors 130 and 132 may be n-type transistors, such as npn or NMOS transistors. Transistor 130 may be a diode-connected transistor with a load terminal and a control terminal connected to a current source. Transistor 132 may have a load terminal that is coupled to feedback circuit output node 124. Each of transistors 130 and 132 may have a load terminal that is connected to negative supply rail 127. If transistors 130 and 132 are BJTs, the emitter terminal may be connected to negative supply rail 127, and if transistors 130 and 132 are MOSFETs, the source terminal may be connected to negative supply rail 127.

Current mirror 128 may include transistors 134 and 136 that may be BJTs, MOSFETs, or any other transistors or analog devices. In some examples, transistors 134 and 136 may be p-type transistors, such as pnp or PMOS transistors. Transistor 136 may be a diode-connected transistor with a load terminal and a control terminal connected to transistor 138. Transistor 134 may have a load terminal that is coupled to feedback circuit output node 124. Each of transistors 134 and 136 may have a load terminal that is connected to positive supply rail 129. If transistors 134 and 136 are BJTs, the emitter terminal may be connected to positive supply rail 129, and if transistors 134 and 136 are MOSFETs, the source terminal may be connected to positive supply rail 129.

Figure 7:
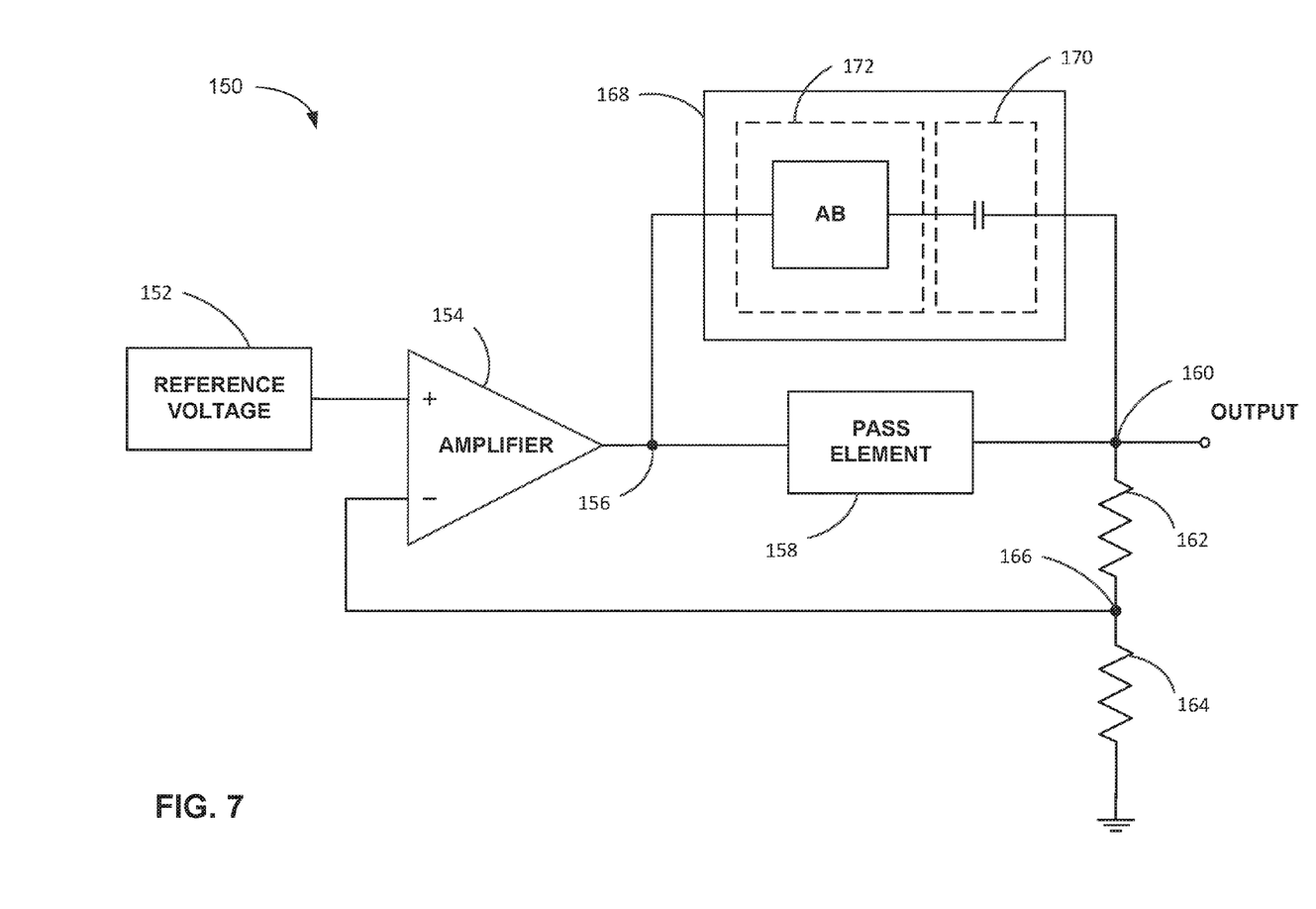
FIG. 7 is a conceptual block and circuit diagram of a voltage regulator with a single-capacitor differentiator stage in accordance with some examples of this disclosure.

FIG. 7 is a conceptual block and circuit diagram of a voltage regulator 150 with a single-capacitor differentiator stage in accordance with some examples of this disclosure. Voltage regulator 150 may function in a similar manner to voltage regulator 30 in FIG. 2. The components of voltage regulator 150 may be similar to the components of voltage regulator 30, except that feedback circuit 168 has a single-capacitor differentiator stage 170. Voltage regulator 150 may be suitable for low-power features because the quiescent current of feedback output stage 172 may be controlled by the geometric ratios of the analog devices within feedback output stage 172. Feedback output circuit 172 may be relatively simple because of the low number of analog devices. Moreover, fabrication of feedback output circuit 172 may be achieved with low-cost technologies.

Amplifier stage 154 may receive reference voltage 152 and the voltage at divider node 166. Amplifier stage 34 may act as a comparator or as an error amplifier. Amplifier stage 154 may amplify the difference between reference voltage 152 and the voltage at divider node 166. Amplifier stage 154 may output an electrical signal to amplifier node 156.

Pass element 158 may be configured to receive electrical signals from amplifier stage 154 and from feedback circuit 168. Pass element 158 may include a transistor that increases or decreases the flow of electrical current to output node 160 depending on the electrical signal received from amplifier node 156.

Resistors 162 and 164 may divide the voltage at output node 160 and output the divided voltage to divider node 166. Divider node 166 may be coupled to the negative input terminal of amplifier stage 154. As the voltage at output node 160 increases, the voltage at divider node 166 may increase, thereby decreasing the voltage at amplifier node 156. Therefore, the output voltage of the pass element may be based on an impedance of the resistor 162, in relation to the impedance of resistor 164.

Feedback circuit 168 may be configured to receive an electrical signal from output node 160 and output an electrical signal to amplifier node 156. Feedback circuit 168 may contain a single-capacitor differentiator stage 170 coupled to output node 160 and a feedback output stage 172 coupled to amplifier node 156. Feedback output stage 172 may include a class AB output stage such as a push-pull circuit offering push-pull output functionality. In some examples, feedback circuit 168 may be configured to generate, transmit, and output a negative feedback to amplifier node 156 based on the output voltage of pass element 158. In some examples, the negative feedback may be a negative current or voltage when the voltage at output node 160 increases, or the negative feedback may be a positive current or voltage when the voltage at output node 160 decreases.

Figure 8:
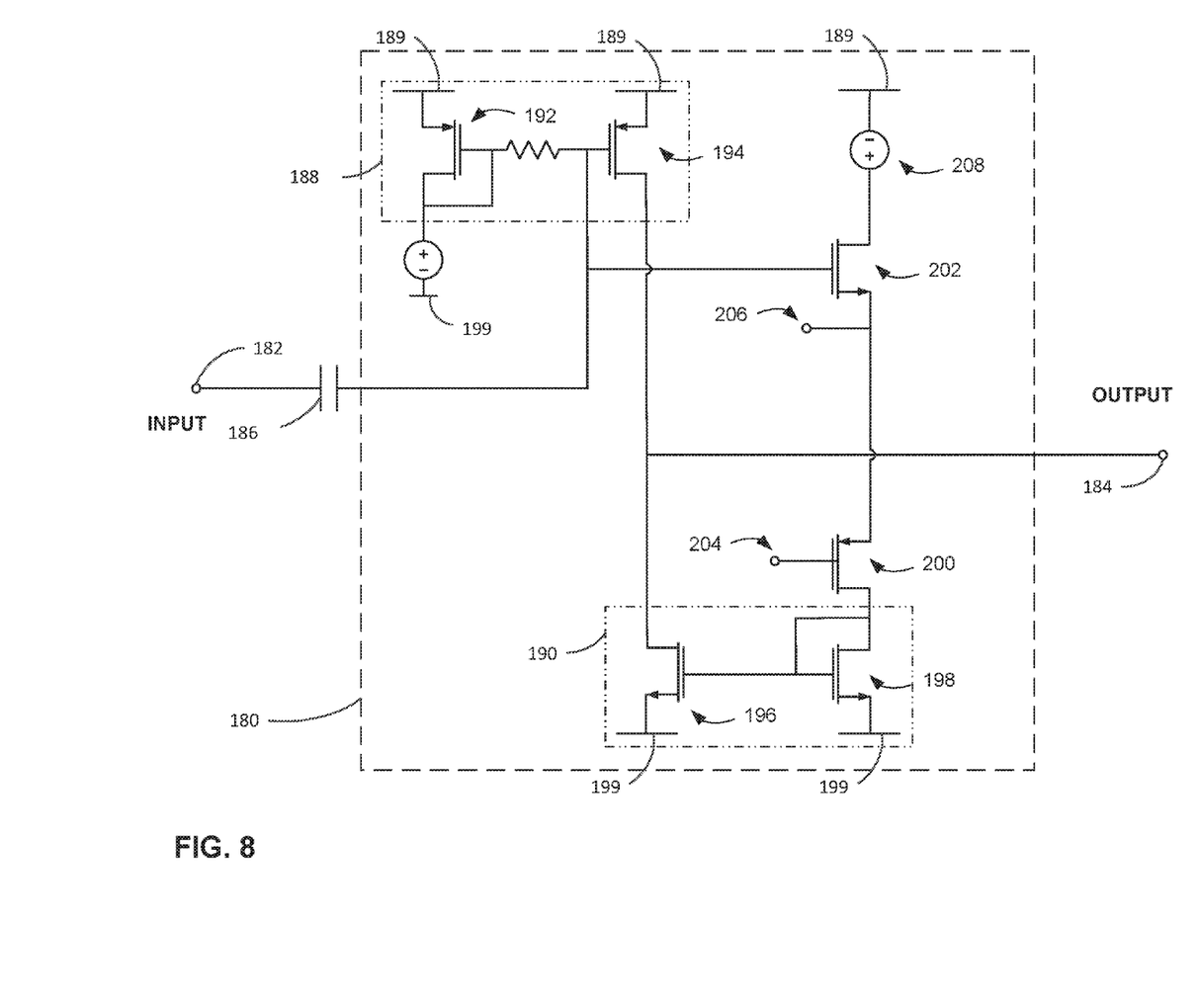
FIG. 8 is a circuit diagram of a feedback circuit with metal-oxide-semiconductor field-effect transistors in a voltage regulator in accordance with some examples of this disclosure.

FIG. 8 is a circuit diagram of a feedback circuit 180 with metal-oxide-semiconductor field-effect transistors 192, 194, 196, 198, 200, 202 in a voltage regulator in accordance with some examples of this disclosure. Feedback circuit 180 may function in a similar to feedback output stage 120 in FIG. 6, except that feedback circuit 180 includes MOSFETs instead of BJTs. Feedback circuit 180 also includes diode-connected transistor 208, although diode-connected transistor 208 may be optional depending on the configuration of feedback circuit 180. As with all circuits described herein, feedback circuit 180 may include BJTs or other analog devices and may function in a similar manner with other analog devices.

Differentiator capacitor 186 may be coupled between feedback circuit input node 182 and feedback output stage 180. Feedback output stage 180 may be coupled between differentiator capacitor 186 and feedback circuit output node 184. Feedback circuit input node 182 may be coupled to output node 160 of a voltage regulator, and feedback output stage output node 184 may be coupled to amplifier node 156, as shown in FIG. 7. Feedback output stage 180 may be a class AB output stage circuit such as a push-pull amplifier circuit offering push-pull output functionality.

Feedback output stage 180 may be configured to increase the voltage at feedback circuit output node 184 when the voltage at feedback circuit input node 182 is decreasing. When the voltage at feedback circuit input node 182 is decreasing, current mirror 188 may push current from positive supply rail 189 through transistor 194 to feedback circuit output node 184. The quiescent current through transistor 194 may be based on a geometric ratio between transistors 192 and 194.

Feedback output stage 180 may be configured to decrease the voltage at feedback circuit output node 184 when the voltage at feedback circuit input node 182 is increasing. When the voltage at feedback circuit input node 182 is increasing, current mirror 190 may pull current from feedback circuit output node 184 through transistor 196 to negative supply rail 199.

Bias voltage input nodes 204 and 206 may supply bias voltages to feedback output stage 180. For example, when the voltage at feedback circuit input node 182 is increasing, transistor 202 may conduct current from diode-connected transistor 208 to bias voltage input node 206. When transistor 202 conducts current, transistor 200 may also conduct, based on the voltage at bias voltage input node 204. If both transistors 200 and 202 conduct, the voltage at the control terminals of current mirror 190 may be high enough that transistor 196 will pull current from feedback circuit output node 184 to negative supply rail 199.

Current mirror 188 may include two transistors 192 and 194 separated by a resistor. Transistors 192 and 194 may be BJTs, MOSFETs, or any other transistors or analog devices. In some examples, transistors 192 and 194 may be p-type transistors, such as pnp or PMOS transistors. Transistor 192 may be a diode-connected transistor with a load terminal and a control terminal connected to a current source. Transistor 194 may have a control terminal that is coupled to differentiator capacitor 186 and a load terminal that is coupled to feedback circuit output node 184. Each of transistors 192 and 194 may have a source terminal that is connected to positive supply rail 189. If transistors 192 and 194 are BJTs, the emitter terminal may be connected to positive supply rail 189.

Current mirror 190 may include transistors 196 and 198 that may be BJTs, MOSFETs, or any other transistors or analog devices. In some examples, transistors 196 and 198 may be n-type transistors, such as npn or NMOS transistors. Transistor 198 may be a diode-connected transistor with a load terminal and a control terminal connected to the control terminal of transistor 196. Transistor 196 may have a load terminal that is coupled to feedback circuit output node 184. Each of transistors 196 and 198 may have a source terminal that is connected to negative supply rail 199. If transistors 196 and 198 are BJTs, the emitter terminal may be connected to negative supply rail 199.

Numerous other configurations are possible for feedback circuit 180. Feedback circuit 180 may include different analog devices, such as JFETs, IGBTs, or diodes, among others. Feedback circuit 180 may use a configuration similar to FIG. 6, in which feedback circuit input 122 is coupled to low side current mirror 126, or a configuration similar to FIG. 8, in which feedback circuit input 182 is coupled to high side current mirror 188. Feedback circuit 180 may use diode connected transistors (not shown in FIG. 8) to provide bias voltages at nodes 204 and 206.

Figure 9:
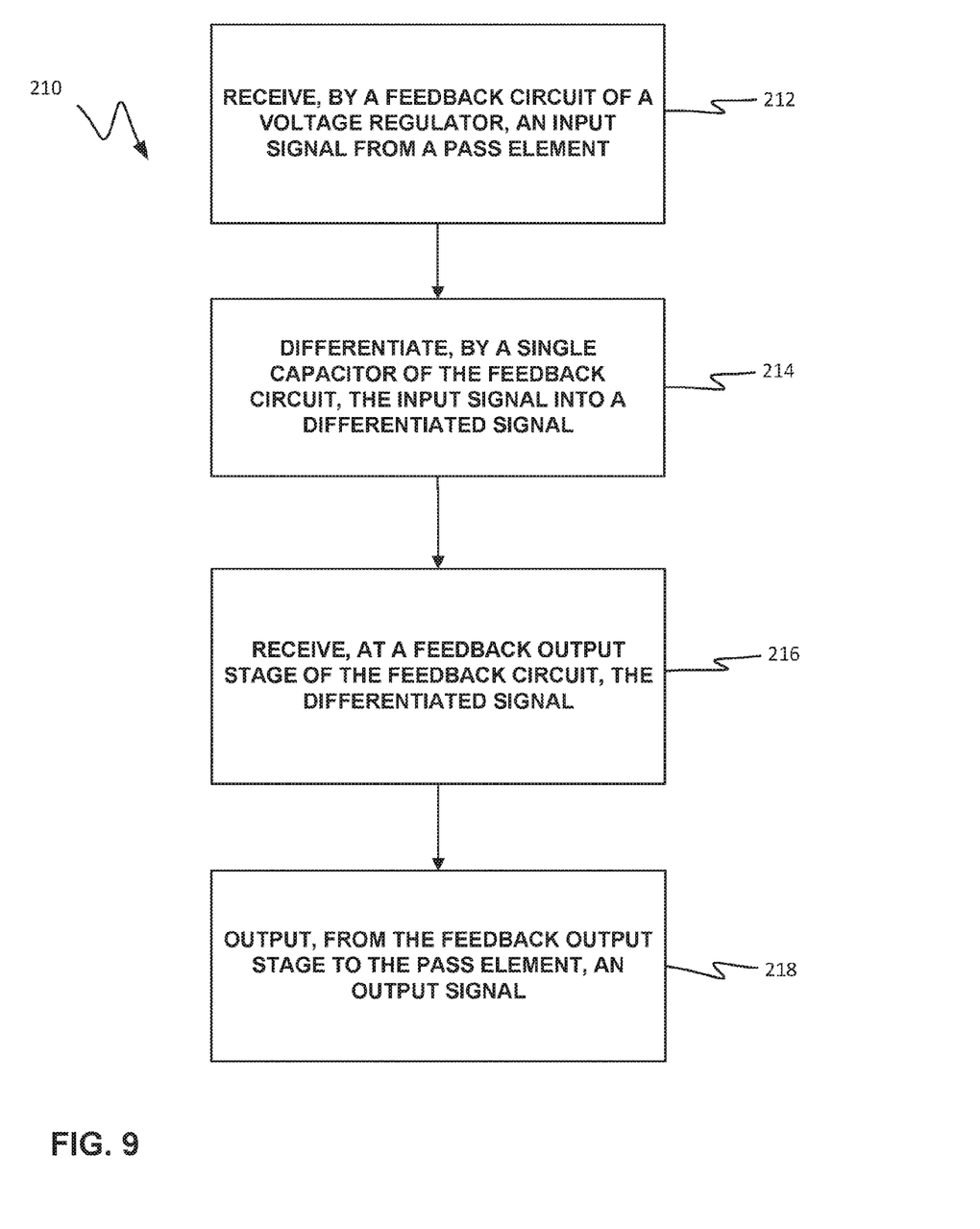
FIG. 9 is a flowchart illustrating a method for generating fast feedback in accordance with some examples of this disclosure.

FIG. 9 is a flowchart illustrating a method for generating fast feedback in accordance with some examples of this disclosure. Process 210 is described from the perspective of feedback circuit 168 in FIG. 7. As shown in FIG. 9, feedback circuit 168 of voltage regulator 150 receives an input signal from pass element 158, which is coupled to output node 160 (212). The input signal may be a regulated voltage signal that may include load transient response features such as overshoots and undershoots during startup and when reference voltage 152 changes abruptly. The regulated voltage signal may also include overshoots and undershoots if the load impedance changes abruptly.

A single differentiator capacitor 170 of feedback circuit 168 may differentiate the input signal into a differentiated signal (214). If the voltage of the signal at output node 160 increases, capacitor 170 may translate the input signal into a positive current. Conversely, if the voltage of the signal at output node 160 decreases, capacitor 170 may translate the input signal into a negative current.

Feedback circuit 172 may receive the differentiated signal from the single differentiator capacitor 170 (216). Feedback output stage 172 may be a class AB output stage with a push-pull circuit. Feedback output stage 172 may comprise two current mirrors to push or pull current to or from positive or negative supply rails 189, 199 to amplifier node 156. Feedback output stage 172 may transform a positive input current into a negative output current, and vice versa, thereby creating negative feedback for voltage regulator 150.

Feedback output stage 172 may output an output signal from the feedback output stage to pass element 158 (218). The output signal may comprise negative feedback from output node 160 to amplifier node 156. When the negative feedback signal combines with a signal from an output of amplifier stage 154, the negative feedback signal may offset any sudden increase or decrease in the output of amplifier stage 154. The components of feedback circuit 168 allow for fast feedback for voltage regulator 150, thereby maintaining the voltage at output node 160 within a tight tolerance.

The following numbered examples demonstrate one or more aspects of the disclosure.

Example 1

A voltage regulator comprises an amplifier stage and a pass element configured to receive an output signal of the amplifier stage and an output signal of a feedback circuit. The voltage regulator further comprises the feedback circuit configured to receive the output signal of the pass element, wherein the feedback circuit includes a differentiator stage coupled to a feedback output stage, and wherein the differentiator stage comprises a single capacitor configured to differentiate the output signal of the pass element.

Example 2

The voltage regulator of example 1, wherein the feedback circuit is configured to generate a feedback opposing changes in the voltage of the output signal of the pass element.

Example 3

The voltage regulator of any combination of examples 1-2, wherein the feedback circuit is configured to maintain the output signal of the pass element at a constant voltage.

Example 4

The voltage regulator of any combination of examples 1-3, wherein the amplifier stage includes a first amplifier input, a second amplifier input, and an amplifier output, wherein the first amplifier input is coupled to a reference voltage. The pass element further includes a pass input and a pass output, wherein the pass input is coupled to the amplifier output and a feedback circuit output. A feedback resistor is coupled between the pass output and the second amplifier input. The feedback circuit further includes a feedback circuit input and the feedback circuit output, wherein the feedback circuit input is coupled to the pass output.

Example 5

The voltage regulator of any combination of examples 1-4, further comprising a smoothing capacitor coupled between the pass output and the second amplifier input.

Example 6

The voltage regulator of any combination of examples 1-5, wherein the differentiator stage is coupled between the feedback circuit input and the feedback output stage. The differentiator stage is configured to receive the output signal of the pass element. The feedback output stage is coupled between the differentiator stage and the feedback circuit output.

Example 7

The voltage regulator of any combination of examples 1-6, wherein the feedback output stage includes a first current mirror and a second current mirror. The first current mirror is configured to reduce a voltage of the output signal of the feedback circuit when a voltage of the output signal of the pass element increases, and the second current mirror is configured to increase the voltage of the output signal of the feedback circuit when the voltage of the output signal of the pass element decreases.

Example 8

The voltage regulator of any combination of examples 1-7, wherein the first current mirror comprises two n-type transistors, and wherein the second current mirror comprises two p-type transistors.

Example 9

The voltage regulator of any combination of examples 1-8, wherein the first current mirror or the second current mirror contains a resistor coupled between two transistors.

Example 10

The voltage regulator of any combination of examples 1-9, wherein the feedback output stage includes push-pull output circuit, a first current mirror, and a second current mirror. The feedback circuit is configured to generate a negative feedback, based on the output signal of the pass element.

Example 11

The voltage regulator of any combination of examples 1-10, wherein the feedback output stage includes a class AB output stage.

Example 12

The voltage regulator of any combination of examples 1-11, wherein a voltage of the output signal of the pass element is based on an impedance of the feedback resistor.

Example 13

A method comprises: receiving, by a feedback circuit of a voltage regulator, an input signal from a pass element of the voltage regulator. The method further comprises differentiating, by a single capacitor of the feedback circuit, the input signal into a differentiated signal. The method further comprises receiving, at a feedback output stage of the feedback circuit, the differentiated signal. The method further comprises outputting, from the feedback output stage to the pass element, an output signal.

Example 14

The method of example 13, further comprising generating, by the feedback circuit and based on the input signal, a negative feedback. The method further comprises outputting, from the feedback output stage to the pass element, the negative feedback.

Example 15

The method of any combination of examples 13-14, further comprising reducing, by a first current mirror of the feedback output stage, a voltage of the output signal when a voltage of the input signal increases. The method further comprises increasing, by a second current mirror of the feedback output stage, the voltage of the output signal when the voltage of the input signal decreases.

Example 16

The method of any combination of examples 13-15, wherein the first current mirror comprises two n-type transistors, and wherein the second current mirror comprises two p-type transistors.

Example 17

The method of any combination of examples 13-16, further comprising regulating, by the feedback circuit, a voltage of the input signal.

Example 18

The method of any combination of examples 13-17, wherein an electrical current of the differentiated signal is based on a voltage of the input signal.

Example 19

A feedback circuit configured to receive an input signal from a pass element. The feedback circuit is further configured to differentiate, by a single capacitor of the feedback circuit, the input signal into a differentiated signal. The feedback circuit is further configured to receive, at a feedback output stage of the feedback circuit, the differentiated signal. The feedback circuit is further configured to output, from the feedback output stage to the pass element, an output signal.

Example 20

The feedback circuit of example 19, further configured to generate a feedback opposing changes in the voltage of the output signal of the pass element.

Various examples of the disclosure have been described. Any combination of the described systems, operations, or functions is contemplated. These and other examples are within the scope of the following claims.

What is claimed is:

1. A voltage regulator comprising:
   an amplifier stage;
   a pass element configured to receive an output signal of the amplifier stage and an output signal of a feedback circuit; and
   the feedback circuit configured to receive an output signal of the pass element, wherein the feedback circuit includes:
   a differentiator stage comprising a single capacitor configured to differentiate the output signal of the pass element; and
   a feedback output stage coupled to the differentiator stage, wherein the feedback output stage includes:
   a first current mirror configured to reduce a voltage of the output signal of the feedback circuit when a voltage of the output signal of the pass element increases; and
   a second current mirror configured to increase the voltage of the output signal of the feedback circuit when the voltage of the output signal of the pass element decreases.

2. The voltage regulator of claim 1, wherein the feedback circuit is configured to generate a feedback opposing changes in the voltage of the output signal of the pass element.

3. The voltage regulator of claim 1, wherein the feedback circuit is configured to maintain the output signal of the pass element at a constant voltage.

4. The voltage regulator of claim 1,
   wherein the amplifier stage includes a first amplifier input node a second amplifier input node, and an amplifier output node, wherein the first amplifier input node is coupled to a reference voltage;
   wherein the pass element includes a pass input node and a pass output node, wherein the pass input node is coupled to the amplifier output node and a feedback circuit output node;
   wherein a feedback resistor is coupled between the pass output node and the second amplifier input nod; and
   wherein the feedback circuit includes a feedback circuit input node and the feedback circuit output node wherein the feedback circuit input node is coupled to the pass output node.

5. The voltage regulator of claim 4, further comprising an smoothing capacitor coupled between the pass output node and the second amplifier input node.

6. The voltage regulator of claim 4,
   wherein the differentiator stage is coupled between the feedback circuit input node and the feedback output stage;
   wherein the differentiator stage is configured to receive the output signal of the pass element; and
   wherein the feedback output stage is coupled between the differentiator stage and the feedback circuit output node.

7. The voltage regulator of claim 4, wherein a voltage of the output signal of the pass element is based on an impedance of the feedback resistor.

8. The voltage regulator of claim 1,
wherein the first current mirror comprises two n-type transistors, and
wherein the second current mirror comprises two p-type transistors.

9. The voltage regulator of claim 1,
wherein the first current mirror or the second current mirror contains a resistor coupled between two transistors.

10. The voltage regulator of claim 1,
wherein the feedback output stage includes push-pull output circuit, a first current mirror, and a second current mirror; and
wherein the feedback circuit is configured to generate a feedback opposing changes in the voltage of the output signal of the pass element.

11. The voltage regulator of claim 1, wherein the feedback output stage includes a class AB output stage.

12. A method comprising:
receiving, by a feedback circuit of a voltage regulator, an input signal from a pass element of the voltage regulator;
differentiating, by a single capacitor of the feedback circuit, the input signal into a differentiated signal;
receiving, at a feedback output stage of the feedback circuit, the differentiated signal;
reducing, by a first current mirror of a feedback output stage of the feedback circuit, a voltage of the output signal when a voltage of the input signal increases;
increasing, by a second current mirror of the feedback output stage, the voltage of the output signal when the voltage of the input signal decreases; and
outputting, from the feedback output stage to the pass element, an output signal.

13. The method of claim 12, wherein outputting the output signal comprises:
generating, by the feedback circuit and based on the input signal, a feedback opposing changes in the input signal;
outputting, from the feedback output stage to the pass element, the feedback.

14. The method of claim 12,
wherein the first current mirror comprises two n-type transistors, and
wherein the second current mirror comprises two p-type transistors.

15. The method of claim 12, further comprising:
regulating, by the feedback circuit, a voltage of the input signal.

16. The method of claim 12,
wherein an electrical current of the differentiated signal is based on a voltage of the input signal.

17. A feedback circuit comprising:
a single capacitor configured to:
receive an input signal from a pass element; and
differentiate the input signal into a differentiated signal; and
a feedback output stage configured to receive the differentiated signal, wherein the feedback output stage includes:
a first current mirror configured to reduce a voltage of an output signal when a voltage of the input signal of the pass element increases; and
a second current mirror configured to increase the voltage of the output signal when the voltage of the input signal of the pass element decreases, wherein the feedback output stage is further configured to output the output signal.

18. The feedback circuit of claim 17, wherein the feedback output stage is configured to output the output signal by at least:
generating a feedback opposing changes in the voltage of the input signal.

19. The feedback circuit of claim 17, wherein the feedback output stage is configured to output the output signal by at least maintain the output signal at a constant voltage.

20. The feedback circuit of claim 17, wherein the first current mirror comprises two n-type transistors, and wherein the second current mirror comprises two p-type transistors.

* * * * *